(12) United States Patent
Lysgaard et al.

(10) Patent No.: US 11,578,702 B2
(45) Date of Patent: Feb. 14, 2023

(54) LIGHTNING PROTECTION SYSTEM FOR WIND TURBINE

(71) Applicant: Siemens Gamesa Renewable Energy, Brande (DK)

(72) Inventors: Lars Lysgaard, Lysgaard (DK); John Nieuwenhuizen, Horsens (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 254 days.

(21) Appl. No.: 16/998,438

(22) Filed: Aug. 20, 2020

(65) Prior Publication Data
US 2021/0062794 A1    Mar. 4, 2021

(30) Foreign Application Priority Data

Aug. 28, 2019  (EP) ..................................... 19194141

(51) Int. Cl.
| | |
|---|---|
| *F03D 80/30* | (2016.01) |
| *F03D 80/80* | (2016.01) |
| *F03D 15/20* | (2016.01) |

(52) U.S. Cl.
CPC ............ *F03D 80/30* (2016.05); *F03D 15/20* (2016.05); *F03D 80/85* (2016.05); *F05B 2220/7066* (2013.01)

(58) Field of Classification Search
CPC .......... F03D 80/30; F03D 13/20; F03D 15/20; F03D 9/25
See application file for complete search history.

(56) References Cited

U.S. PATENT DOCUMENTS 6,932,574 B2 *  8/2005  Wobben ................. H02G 13/80
                                                 361/216
7,837,443 B2 * 11/2010  Mikkelsen .............. F03D 80/00
                                                 361/220

(Continued)

FOREIGN PATENT DOCUMENTS

| CN | 201125843 Y | 10/2008 |
|---|---|---|
| CN | 106640552 A | 5/2017 |

(Continued)

OTHER PUBLICATIONS

EPO search report and opinion of foreign filing of instant application (Year: 2020).*

(Continued)

*Primary Examiner* — Woody A Lee, Jr.
*Assistant Examiner* — Wesley Le Fisher
(74) *Attorney, Agent, or Firm* — Schmeiser, Olsen & Watts LLP (57) ABSTRACT

Provided is a wind turbine including a generator enclosed in a generator housing, the generator housing including a rotating housing and a stationary housing, whereby the rotating housing is separated from the stationary housing by a first gap; a canopy mounted on a tower and including an electrical connection to a down conductor of the tower, wherein the canopy is separated from the generator housing by a second gap; a lightning current path provided by a plurality of brush assemblies mounted on the stationary housing, wherein a brush assembly includes a brush holder mounted on the stationary housing such that a carbon brush extends across the first gap to make electrical contact with the rotating housing; and an electrical connector extending across the second gap to electrically connect the brush holder to the canopy. Also provided is a method of providing a lightning current path for such a wind turbine.

15 Claims, 5 Drawing Sheets

(56) References Cited

U.S. PATENT DOCUMENTS

| | | | | |
|---|---|---|---|---|
| 9,157,419 B2* | 10/2015 | Lewke | .................... | F03D 80/30 |
| 9,181,927 B2* | 11/2015 | Lewke | .................... | F03D 80/30 |
| 9,334,852 B2* | 5/2016 | Olsen | .................... | F03D 80/30 |
| 9,422,924 B2* | 8/2016 | Thiel | ...................... | F03D 13/20 |
| 9,689,376 B2* | 6/2017 | Booth | .................. | F03D 7/0248 |
| 9,752,560 B2* | 9/2017 | Huang | .................. | H02G 13/80 |
| 10,066,607 B2* | 9/2018 | Søgaard | ................ | F03D 1/065 |
| 10,612,525 B2* | 4/2020 | Huang | .................... | F03D 80/30 |
| 2014/0348656 A1* | 11/2014 | Huang | .................... | H02G 13/80 |
| | | | | 416/146 R |
| 2016/0252078 A1 | 9/2016 | Søgaard et al. | | |
| 2017/0353080 A1 | 12/2017 | Thygesen et al. | | |

FOREIGN PATENT DOCUMENTS

| | | |
|---|---|---|
| DE | 102004010104 A1 | 9/2005 |
| EP | 3226383 A1 | 10/2017 |
| EP | 3252928 A1 | 12/2017 |
| WO | WO 2008006377 A1 | 1/2008 |
| WO | WO 2011069686 A1 | 6/2011 |
| WO | WO 2018153520 A1 | 8/2018 |

OTHER PUBLICATIONS

European Search Report dated Mar. 19, 2020 for Application No. 19194141.8.

* cited by examiner

LIGHTNING PROTECTION SYSTEM FOR WIND TURBINE

CROSS-REFERENCE TO RELATED APPLICATIONS

This application claims priority to European Application No. 19194141.8, having a filing date of Aug. 28, 2019, the entire contents of which are hereby incorporated by reference.

FIELD OF TECHNOLOGY

The following describes a direct-drive wind turbine, and a method of providing a lightning current path for a direct-drive wind turbine.

BACKGROUND

A wind turbine is generally equipped with a lightning protection system (LPS) that aims to provide a current path to guide lightning current to ground. Since the rotor blades are the most vulnerable targets on account of their height and exposed position, each rotor blade usually incorporates a down conductor in its interior. Electrically conductive "attractors" or targets can be provided at one or more points on the blade exterior and connected to the down conductor, in order to attract a lightning strike in a controlled manner. The down conductors of the rotor blades lead to the hub. It is then necessary to provide a bridge between the rotating hub and the stationary nacelle so that the lightning current can be guided to a down conductor of the wind turbine tower and then to ground. One way of doing this is to use a sliding contact between a rotating down conductor in the hub and a stationary down conductor in the nacelle. Such an approach is proposed by WO2011069686A1 for a direct-drive wind turbine, for the lightning current path from rotor blade down conductor to a stationary main shaft of the generator. The same principle is also applied in CN201125843Y for the lightning current path from rotor blade down conductor to a nacelle down conductor in an indirect-drive wind turbine.

However, depending on the generator design, it may be difficult to ensure that very high lightning currents are reliably brought to ground through such current bridges. It may happen that some part of the lightning current seeks an alternative route to ground, resulting in flashover to components that may be severely damaged as a result. For example, flashover to a main bearing can severely damage the bearing, leading to downtime and costly repair procedures.

Furthermore, a requirement that must be fulfilled by certain types of wind turbines is that of EMC (electromagnetic compatibility) screening.

SUMMARY

An aspect relates to an improved lightning protection system for a wind turbine to overcome the problems outlined above.

In the context of embodiments of the invention, a direct-drive wind turbine shall be understood to comprise a generator that is enclosed in a generator housing. The generator housing comprises a rotating housing and a stationary housing. It may be assumed that the generator housing is made primarily of a material such as steel and is therefore electrically conductive. It may also be assumed in the following that lightning current from the aerodynamic rotor is led to the rotor housing, for example by electrically connecting the rotor blade down conductors to the body of the generator rotor housing.

An aerodynamic rotor comprising rotor blades mounted to a hub will cause the rotating component to turn during operation of the generator. To avoid collision when the generator is operational, the rotating housing is separated from the stationary housing by a first gap or "housing gap". The wind turbine further comprises a canopy mounted on a tower, and the canopy includes elements of the LPS for electrical connection to a down conductor of the tower. The canopy is separated from the generator housing by a second gap or "canopy gap", here also in order to avoid collision between the outer rotor and the canopy.

The inventive wind turbine is characterized by a lightning current path that is provided by a plurality of brush assemblies mounted on the generator housing, wherein a brush assembly comprises a brush holder mounted on the stationary housing such that a carbon brush contained in the brush holder extends across the housing gap to make electrical contact with the rotating housing, and an electrical connector extending across the canopy gap to electrically connect the brush holder to the LPS elements of the canopy.

In the following, it may be assumed that the brush holder comprises an electrically conductive material such as steel. Since the carbon brush is in electrical contact to the brush holder, and the electrical lead originates in the brush holder, any electrical current entering the carbon brush from the rotating housing will pass through the electrical lead to the LPS elements of the canopy.

An advantage of the wind turbine according to embodiments of the invention is that the plurality of brush assemblies provides a reliable lightning current path from the aerodynamic rotor to the LPS elements of the canopy, and from there to ground. With a sufficient number of brush assemblies, even a very high lightning current can be reliably guided through this brush assembly arrangement on its way to ground. The likelihood of damage to components of the wind turbine is therefore favorably reduced or even essentially eliminated. For example, the main bearing can be reliably protected from flashover during a lightning event.

The inventive method of providing a lightning current path for a wind turbine of the type described above comprises steps of providing a plurality of first brush assemblies, wherein a first brush assembly comprises a brush holder containing a carbon brush, and an elongated electrical connector or lead originating in the brush holder and terminating at an outer end; mounting each brush holder on the stationary housing such that the carbon brush extends across the first gap to make electrical contact with the rotating housing; extending the lead across the second gap and securing its outer end to the canopy so that an electrical connection is made between the lead and an LPS element of the canopy.

Particularly advantageous embodiments and features of the invention are given by the dependent claims, as revealed in the following description. Features of different claim categories may be combined as appropriate to give further embodiments not described herein.

The expression "rotating component of the generator" is to be understood in the sense that this generator component is realized to turn when the generator is in operation. The LPS will of course be equally effective when the generator is not operational, i.e. when the rotor and rotor housing are not actually turning.

The generator housing shall be understood to comprise two parts, a rotating housing that encloses the generator rotating component, and a stationary housing that encloses a generator stationary component. In the following, without restricting embodiments of the invention in any way, it may be assumed that the outer rotor is constructed to act as the generator field, although it is possible that the outer rotor carries the armature.

In such a direct-drive wind turbine with outer rotor, a main shaft may extend from a front end (i.e. the drive end or upwind end) of the outer rotor into the interior of the canopy. This main shaft may have a large diameter. The outer rotor is mounted about the main shaft by a main bearing at the front end. Another bearing at the non-drive end of the main shaft may be provided, to support the non-drive end of the outer rotor.

In a particularly preferred embodiment of the invention, the wind turbine comprises at least 10 brush assemblies, more preferably at least 20 brush assemblies, most preferably at least 30 brush assemblies mounted in an annular arrangement on the generator housing to provide a lightning current path across the canopy gap to the LPS elements of the canopy. The current-carrying capacity of an LPS may be specified in a relevant regulation or standard, for example the International Standard IEC 61400-24 that is published by the International Electrotechnical Commission and that relates to wind turbines. A wind turbine may be required to have an LPS that can transport 200 kA lightning current. The actual number of brush assemblies may be chosen according to the current-carrying capacity of the carbon brush and the lead. The current-carrying capacity of the lead of a brush assembly is at least as large as the current-carrying capacity of its carbon brush.

The electrical connector or lead is flexible, and may be realized as a ribbon cable or a cable braid, so that it can undergo deformation in the event that the canopy gap is not constant as the outer rotor turns. This flexibility ensures that the lead continually bridges the canopy gap, even if the gap width varies or fluctuates owing to the large forces exerted by the aerodynamic rotor on the main shaft. The electrical connection between generator housing and canopy LPS is therefore unaffected by any slight movements of the generator housing relative to the canopy.

Each of these brush assemblies is preferably realized such that its carbon brush continually bridges a housing gap of at least 5 mm, more preferably at least 10 mm, most preferably at least 15 mm. Each of these brush assemblies is realized such that its flexible lead continually bridges a canopy gap of at least 10 cm, more preferably at least 20 cm, most preferably at least 30 cm. The LPS elements of the canopy may be provided as an arrangement of down conductors that are incorporated in the body of the canopy, or mounted onto the interior and/or exterior of the canopy. The LPS elements of the canopy are arranged to guide lightning current to a down conductor arrangement of the tower. Lightning current can originate from a strike to the canopy itself and/or from a strike to the aerodynamic rotor, in which case the brush assemblies that bridge the canopy gap provide a path to the lightning current. In a particularly preferred embodiment of the invention, the LPS elements of the canopy are realized as an electrically conductive mesh. In this way, the canopy acts as a Faraday cage and provides effective EMC shielding for components inside the canopy.

The plurality of brush assemblies bridging the canopy gap with the leads extending between stator housing and canopy also act as a type of Faraday cage, so that the overall Faraday cage effect is created by the combination of brush assemblies at the generator/canopy interface and the conductive mesh of the canopy. Charge will therefore be distributed evenly over the canopy and the generator housing.

As mentioned above, EMC shielding may be implemented for various parts of a wind turbine. In a preferred embodiment of the invention, the stator housing is constructed to provide EMC shielding for the stator, which may be assumed to be realized as the generator armature. In such an embodiment, the stator housing may comprise an annular metal plate (realized in one piece or in sections) arranged about the main shaft to effectively close off the generator at its non-drive end. The metal plate is dimensioned to leave only a very small housing gap between its outer edge and the rotor housing. This annular plate may serve to guide a cooling air-flow over the stator windings, and also serves to provide EMC shielding. In a particularly preferred embodiment of the invention, the brush assemblies are mounted onto this "EMC shielding plate".

As indicated above, lightning current will always seek the fastest path to ground, and a severe lightning strike may result in portions of the lightning current seeking an alternative to the path provided by a wind turbine's LPS. As a result, flashovers may occur with damage to vulnerable components. In a preferred embodiment of the invention, therefore, a second brush assembly is provided to offer an additional path to lightning current. This second brush assembly is provided at the drive end of the generator. In this embodiment, the second brush assembly is mounted to a turner ring. Such a turner ring may be provided for use during installation of the wind turbine, for example to turn the hub to a specific position in order to mount a rotor blade. The turner ring generally has a diameter that is larger that the diameter of the main bearing. The turner ring can be realized as a toothed ring that engages with the pinions of a number of motor drive units. Since the purpose of the turner ring is to turn the generator rotor (and the aerodynamic rotor) relative to the stator, there will be a gap between the turner ring and the closest stationary element, for example a stator front plate. In this preferred embodiment of the invention, the second lightning current path is provided by a second brush arrangement comprising at least one brush assembly, preferably a plurality of brush assemblies, to provide an electrical connection between the turner ring and the stationary supporting structure. The second brush arrangement acts to equalize charge distribution or electrical potential across the generator and protects the main bearing from flashover.

A brush assembly that bridges the canopy gap may be referred to as a "canopy gap brush assembly", a "generator housing brush assembly", a "first brush assembly" or an "exterior brush assembly". A brush assembly mounted at the turner ring may be referred to as a "turner ring brush assembly", a "second brush assembly", or an "interior brush assembly".

The annular arrangement of brush assemblies that bridges the canopy gap may be referred to as the "generator housing brush arrangement" or "first brush arrangement", and the arrangement of brush assemblies at the turner ring may be referred to as the "turner ring brush arrangement" or "second brush arrangement".

Some of the embodiments will be described in detail, with references to the following Figures, wherein like designations denote like members, wherein.

DETAILED DESCRIPTION

Figure 1:
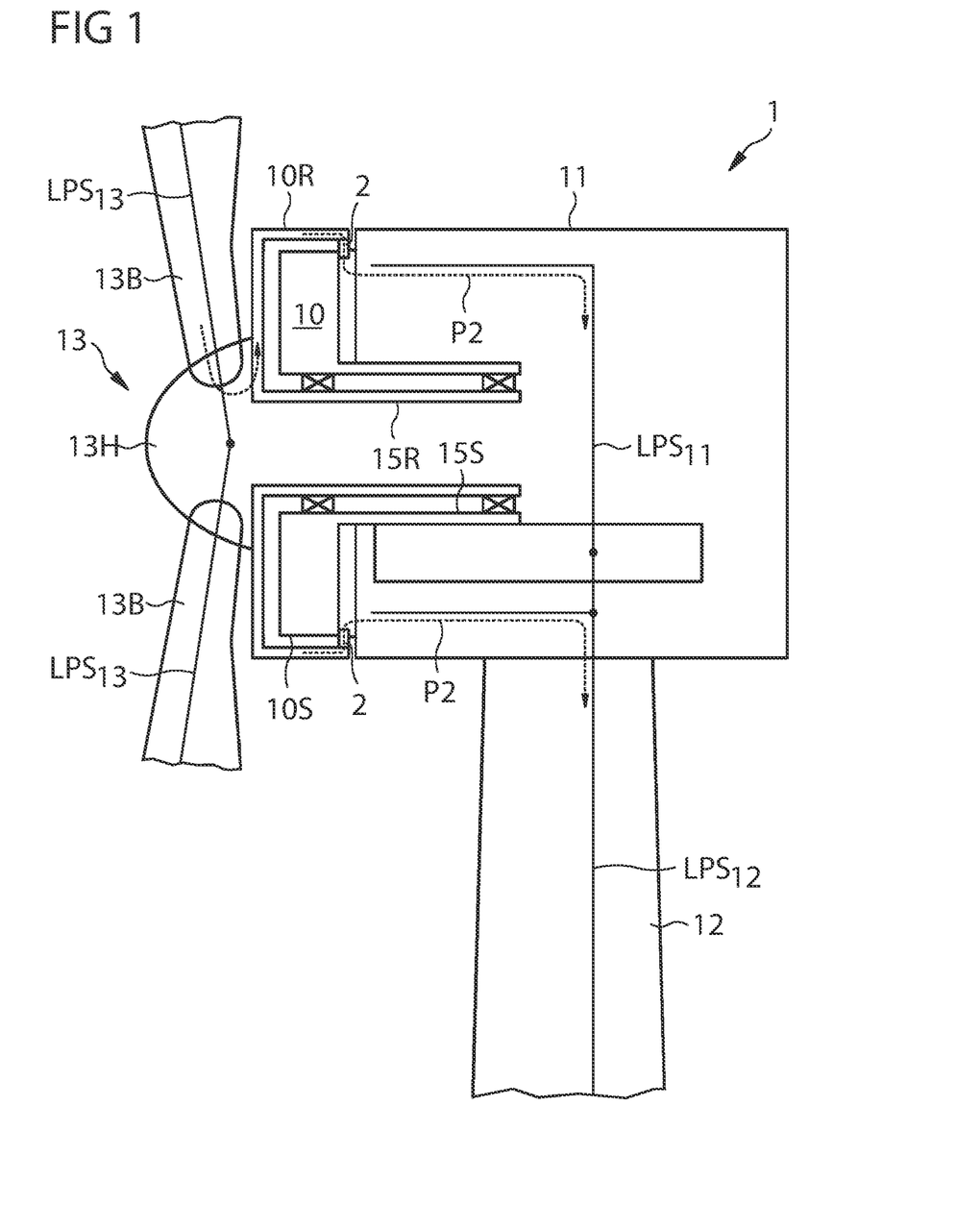
FIG. 1 shows an embodiment of a wind turbine.

FIG. 1 shows a direct-drive outer-rotor wind turbine of the type described above. The wind turbine 1 has a generator 10 that is enclosed in a generator housing 10R, 10S. A rotating housing 10R encloses the outer rotor, and a stationary housing 10S encloses the stator. The rotating housing 10R is separated from the stationary housing 10R by a housing gap G1 of a few mm. The circular shape of the rotor housing 10R may be maintained by an anti-ovalisation ring mounted to the exterior of the rotor housing 10R so that the housing gap G1 may be expected to remain essentially constant.

In the usual design manner, the wind turbine 1 further comprises a canopy 11 mounted on a tower 12, and the canopy 11 is separated from the generator housing 10R, 10S by a canopy gap G2, which may be several cm in width.

The wind turbine has a lightning protection system (LPS) with down conductors arranged in the rotor blades 13 and extending into the hub. This lightning protection system $LPS_{13}$ of the aerodynamic rotor 13 is electrically connected to the rotor housing 10R. The rotor housing 10R may be assumed to be made partially or completely of steel or a similar metal, and is therefore electrically conductive.

The canopy also includes down conductors of a canopy lightning protection system $LPS_{11}$ that are electrically connected to down conductors of a lightning protection system $LPS_{12}$ of the tower 12.

Figure 2:
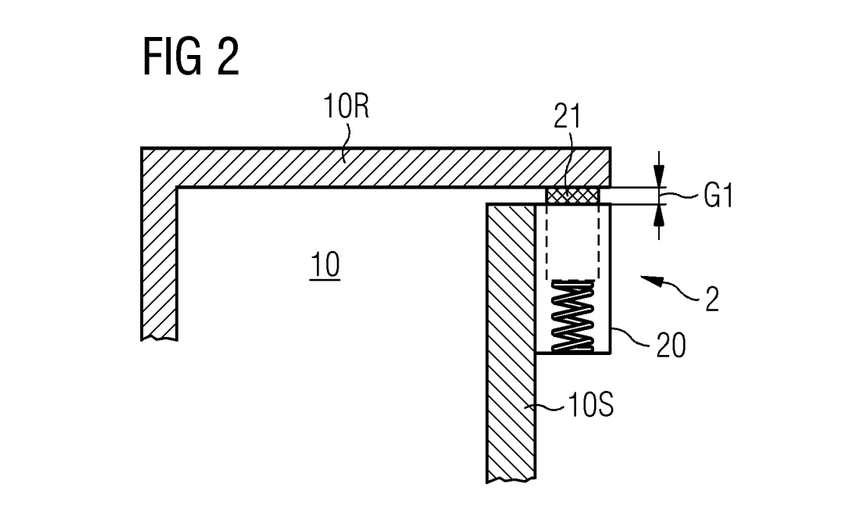
FIG. 2 shows an enlarged detail of the embodiment of FIG. 1.

The wind turbine has a first lightning current path P2 that is provided by a plurality of brush assemblies 2 mounted on the stationary housing 10S. Each of these brush assemblies 2 comprises a brush holder 20 that is mounted on the stationary housing 10S such that a carbon brush 21 extends across the housing gap G1 to make electrical contact with the rotating housing 10R. This is shown in the enlarged view given by FIG. 2. The actual number of brush assemblies 2 is determined according to the current-carrying capacity of the brush assembly type, and on the LPS requirements. For example, a circumferential arrangement of 50 or more brush assemblies 2 may be sufficient to ensure that the voltage between rotor and stator does not exceed 2 kV during a 200 kA lightning strike (for the sake of clarity, only two brush assemblies 2 are shown in FIG. 1). The brush assembly 2 has a spring-loaded mechanism, as will be known to the skilled person, which acts to press the carbon brush 21 against the body of the rotor housing 10R. This ensures that the carbon brush 21 will maintain contact with the rotor housing at all times, even as the brush wears down over time, and even if there are slight variations in the width of the housing gap between rotor housing 10R and stator housing 10S due to ovalization of the rotor. The spring-loaded mechanism ensures that the brush 21 continually bridges the housing gap G1, even if the gap width varies or fluctuates as the outer rotor turns relative to the stationary housing 10S. One stage of the first lightning current path P2 is therefore given by the carbon brush 21 that electrically connects the rotor housing 10R to the stator housing 10S.

The stator housing 10S may be realized to include an EMC shielding plate at the non-drive end of the generator 10. Another known feature of a brush assembly is that the body of the brush assembly is also electrically conductive, and is usually made of steel. Electrical current is therefore passed from the carbon brush to the brush holder. In the inventive wind turbine, the brush holders 20 are mounted in an annular arrangement to the stator housing 10S, so that during a lightning strike or during the build-up to a lightning strike, charge will be able to distribute itself evenly over the EMC shielding plate.

Each brush assembly 2 also has a lead 22 that extends across the canopy gap G2 to electrically connect the brush holder 20 to the LPS elements of the canopy 11. The next stage of the first lightning current path P2 is therefore given by the lead 22 which electrically connects the stator housing 10R to the canopy 11. This is shown in the enlarged view given by FIG. 3. An outer terminal 220 of the lead 22 is connected to a part of the canopy's LPS arrangement. The lead 22 is realized as a flexible part, for example a ribbon cable or cable braid, that can adjust to minor alterations in width of the canopy gap G2. The length of the lead 22 exceeds the canopy gap width by at least 5%, more preferably by at least 10%, so that the leads can compensate for fluctuations in gap width.

Figure 3:
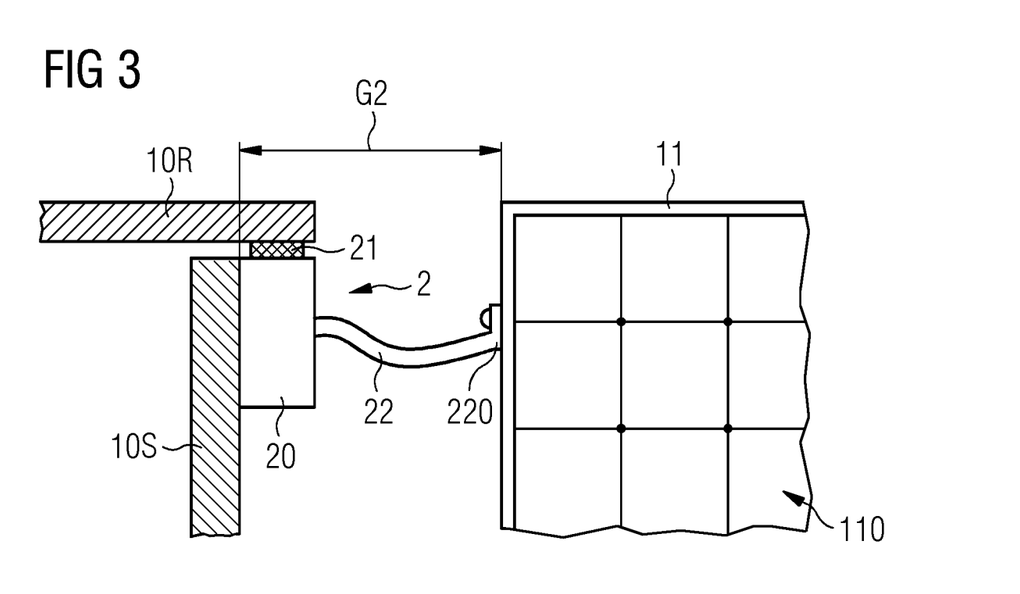
FIG. 3 shows an enlarged detail of the embodiment of FIG. 1.

In this exemplary embodiment, the canopy 11 is realized to incorporate an LPS system $LPS_{11}$ in the form of a conductive mesh 110, and the lead 22 of each brush assembly 2 is connected to a point in this conductive mesh 110.

Figure 4:
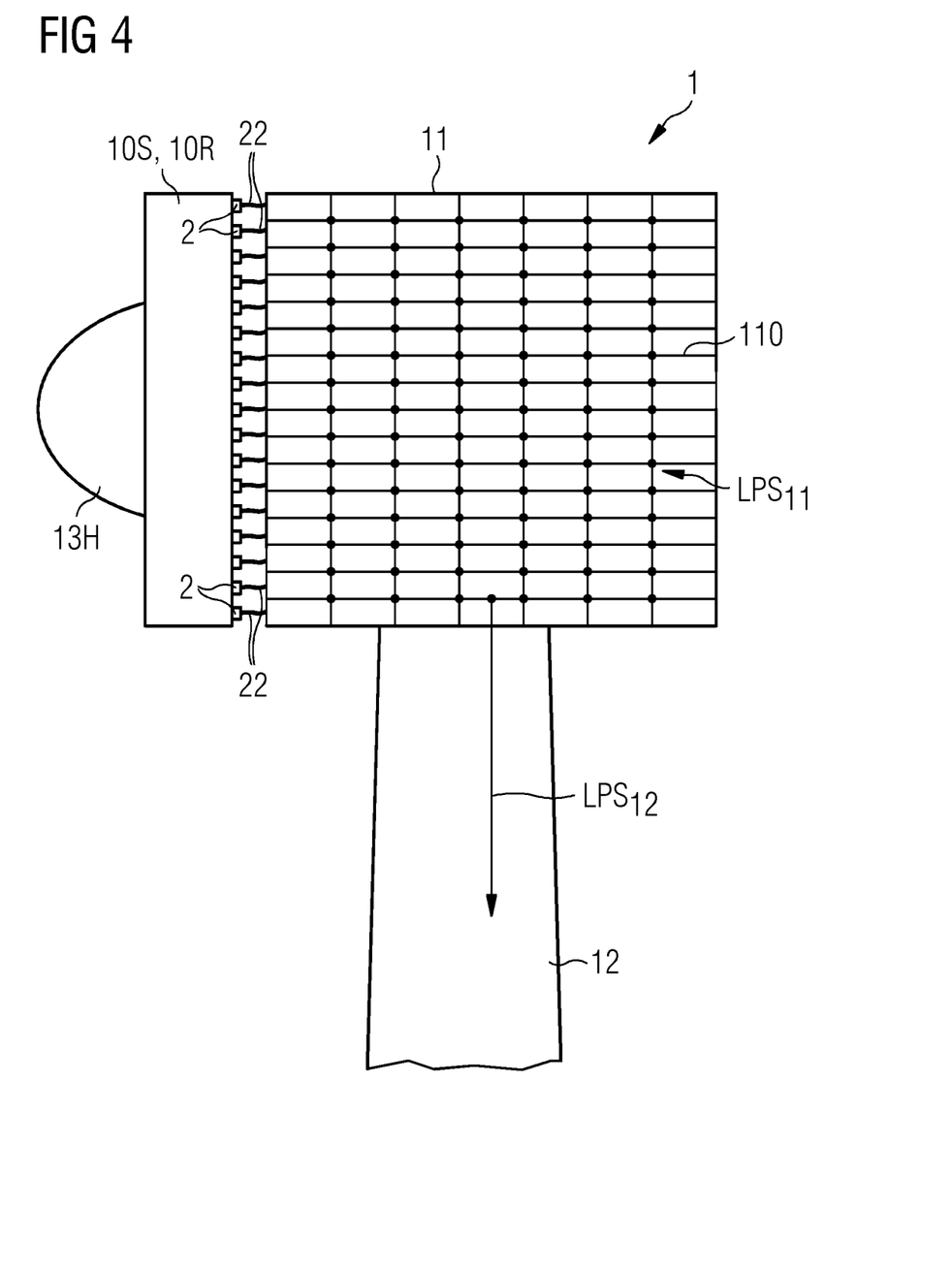
FIG. 4 shows a further embodiment of the wind turbine.

This is illustrated by FIG. 4, which shows (schematically) a plurality of brush assemblies 2 mounted on the stator housing 10S as described above to electrically connect the rotor housing 10R to the conductive mesh 110 in the canopy 11. The conductive mesh 110 in turn is connected to the LPS system $LPS_{12}$ of the tower 21, and from there in the usual manner to ground.

Figure 5:
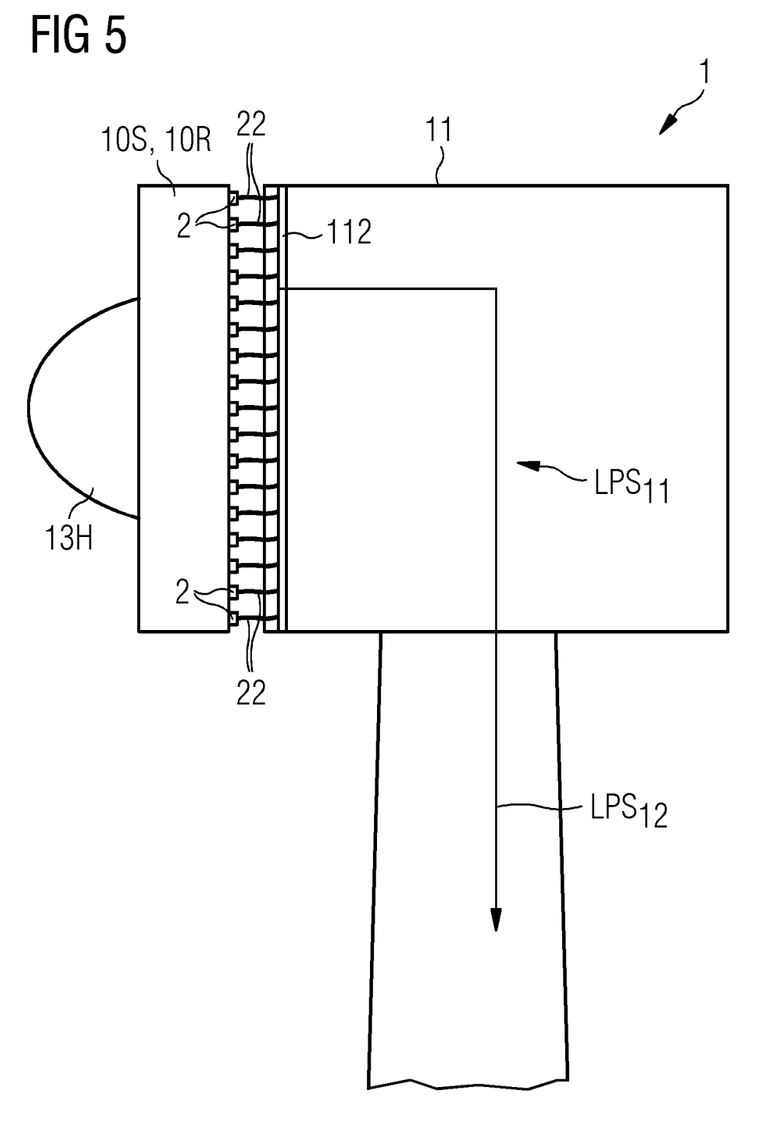
FIG. 5 shows a further embodiment of the wind turbine.

An alternative arrangement is shown in FIG. 5. Here, instead of a conductive mesh in the canopy 11, the canopy 11 is provided with a set of down conductors, one of which is arranged as an annular conductor 112 about the front end of the canopy 11, and all leads 22 of the brush assemblies 2 are connected to this front-end down conductor 112, which in turn is connected to the LPS system $LPS_{11}$ of the canopy 11, leading to the LPS system $LPS_{12}$ of the tower 21, and from there in the usual manner to ground.

Figure 6:
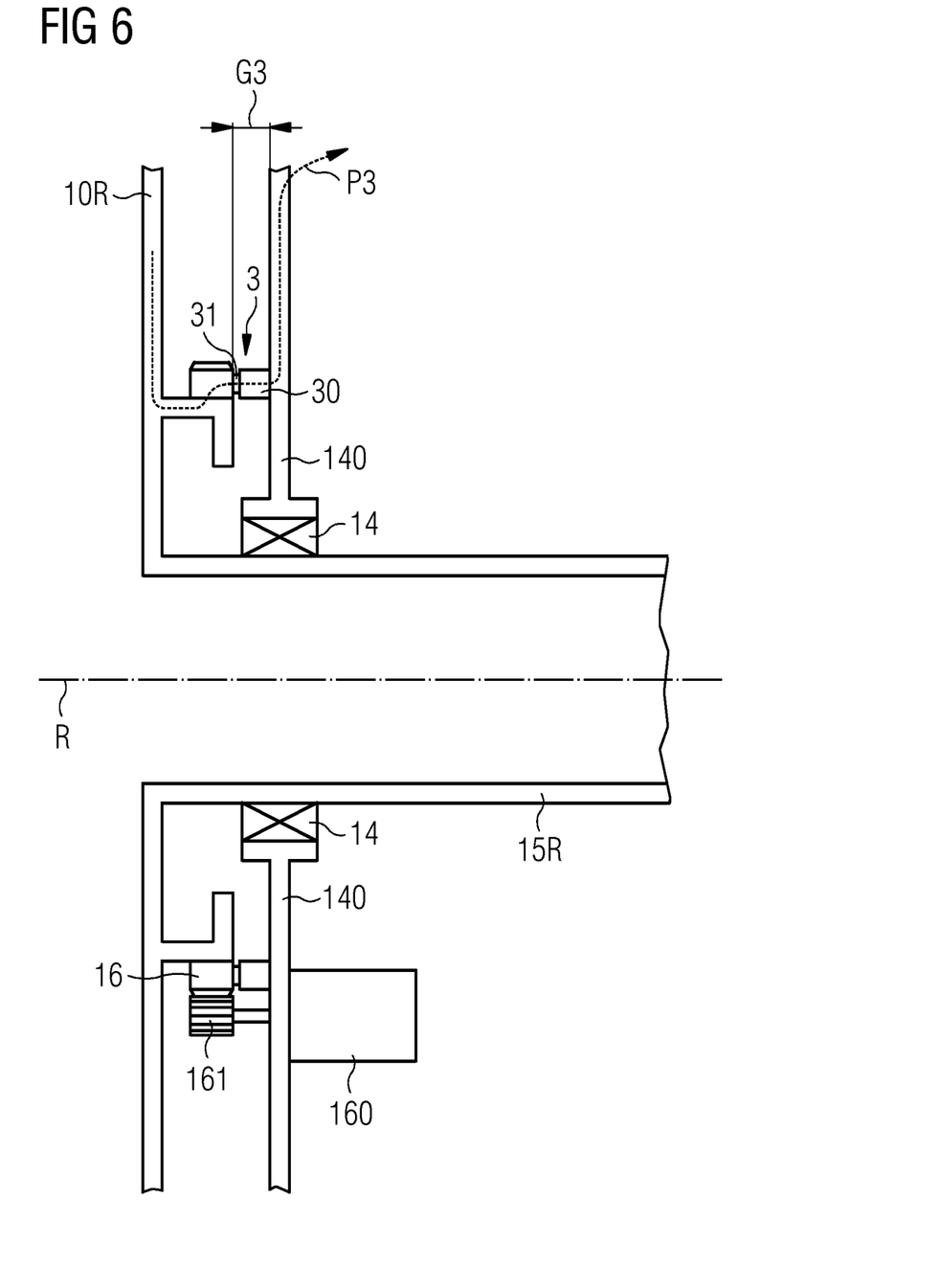
FIG. 6 shows a detail of a further embodiment of the wind turbine.

FIG. 6 shows a further embodiment of the inventive wind turbine 1. The diagram is a cross-section of the region about the main shaft 15S, 15R with its rotating part 15R and stationary part 15S, indicating the generator's axis of rotation. Here, a turner ring 16 is provided for use in the installation of the wind turbine 1. The turner ring 16 is structurally a part of the outer rotor, and remains in place after installation, even if it is no longer required. Drive units 160 anchored in a stationary front plate 140 are used to turn the ring 16 (and therefore the aerodynamic hub). Each drive unit 160 has a pinion 161 that engages with the toothed outer side of the turner ring 16.

The stationary front plate 140 may be assumed to be electrically connected to a bedframe, which in turn may be assumed to be electrically connected in the usual manner to the LPS system of the wind turbine. The diagram shows a second lightning current path P3 that is provided by a plurality of brush assemblies 3 mounted on a stationary front plate 140 that supports the main bearing 14. Each of these brush assemblies 3 comprises a brush holder 30 that is mounted on the stationary front plate 140 such that the brush assembly 3 extends across a turner ring gap G3 to make electrical contact with the turner ring 16. Here also, it may be assumed that a spring-loaded mechanism acts to press the carbon brush 31 against the turner ring 16. In this way, any lightning current reaching the turner ring 16 from the hub 13 will be given a safe path P3 to the stationary front plate 140.

Since this front plate 140 is mounted to the bedframe, a safe path to the down conductors of the tower 12 is ensured.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A direct-drive wind turbine comprising:
a generator enclosed in a generator housing, the generator housing comprising a rotating housing and a stationary housing, and whereby the rotating housing is separated from the stationary housing by a first gap;
a canopy mounted on a tower and comprising an electrical connection to a down conductor of the tower, wherein the canopy is separated from the generator housing by a second gap; and
a lightning current path provided by a plurality of brush assemblies mounted on the stationary housing, wherein a brush assembly comprises:
a brush holder mounted on the stationary housing such that a carbon brush extends across the first gap to make electrical contact with the rotating housing; and
an electrical connector extending across the second gap to electrically connect the brush holder to the canopy.

2. The direct-drive wind turbine according to claim 1, wherein the carbon brush bridges the first gap of at least 5 mm.

3. The direct-drive wind turbine according to claim 1, wherein the electrical connector bridges the second gap of at least 10 cm.

4. The direct-drive wind turbine according to claim 1, wherein the electrical connector is flexible, and wherein a length of the electrical connector exceeds a width of the second gap by at least 5%.

5. The direct-drive wind turbine according to claim 1, wherein the electrical connector is a ribbon cable.

6. The direct-drive wind turbine according to claim 1, further comprising at least 30 brush assemblies mounted in an annular arrangement on the stationary housing.

7. The direct-drive wind turbine according to claim 1, wherein the stationary housing comprises an EMC shielding plate for the generator.

8. The direct-drive wind turbine according to claim 1, further comprising a turner ring for turning a generator rotating component, and a further lightning current path provided by a brush assembly arrangement comprising at least one brush assembly arranged to provide an electrical connection between the turner ring and a stationary supporting structure.

9. The direct-drive wind turbine according to claim 8, wherein the stationary supporting structure is an annular plate arranged about a main shaft of the direct-drive wind turbine.

10. The direct-drive wind turbine according to claim 8, further comprising an annular arrangement of a plurality of brush assemblies between the turner ring and the stationary supporting structure.

11. The direct-drive wind turbine according to claim 1, wherein the direct-drive wind turbine is a direct-drive outer-rotor wind turbine.

12. The direct-drive wind turbine according to claim 1, wherein the generator rotating component is a generator field.

13. A method of providing a lightning current path for a direct-drive wind turbine comprising a generator enclosed in a generator housing, the generator housing including a rotating housing and a stationary housing, and whereby the rotating housing is separated from the stationary housing by a first gap, and a canopy mounted on a tower and comprising an electrical connection to a down conductor of the tower, wherein the canopy is separated from the generator housing by a second gap, the method comprising:
providing a plurality of first brush assemblies, wherein a first brush assembly comprises a brush holder containing a carbon brush, and an elongated electrical connector originating in the brush holder and terminating at an outer end;
mounting each brush holder on the stationary housing such that the carbon brush extends across the first gap to make electrical contact with the rotating housing; and
securing the outer end of the electrical connector to the canopy.

14. The method according to claim 13, further comprising mounting a plurality of second brush assemblies between a turner ring and a stationary supporting structure.

15. The method according to claim 13, further comprising providing a down conductor arrangement in an aerodynamic rotor of the direct-drive wind turbine and electrically connecting the down conductor arrangement to the rotating housing.

* * * * *